(12) United States Patent
Hicks et al.

(10) Patent No.: US 9,092,765 B2
(45) Date of Patent: Jul. 28, 2015

(54) WEARABLE MOBILE SCANNER SYSTEM WITH MOBILE TABLET HAVING A MOBILE POS AND ENTERPRISE RESOURCE PLANNING APPLICATION FOR POS CUSTOMER ORDER FULFILLMENT AND METHOD IN STORE INVENTORY MANAGEMENT FOR RETAIL ESTABLISHMENT

(71) Applicants: Bruce J. Hicks, Windermere, FL (US); Brian K. McWhirter, Winter Garden, FL (US); DeVan McArthur, Gulf Breeze, FL (US); Bromley Williams, Orlando, FL (US)

(72) Inventors: Bruce J. Hicks, Windermere, FL (US); Brian K. McWhirter, Winter Garden, FL (US); DeVan McArthur, Gulf Breeze, FL (US); Bromley Williams, Orlando, FL (US)

(73) Assignee: Retail Technologies Corporation, Orlando, FL (US)

( * ) Notice: Subject to any disclaimer, the term of this patent is extended or adjusted under 35 U.S.C. 154(b) by 356 days.

(21) Appl. No.: 13/783,110

(22) Filed: Mar. 1, 2013

(65) Prior Publication Data

US 2014/0249943 A1    Sep. 4, 2014

(51) Int. Cl.
*G07G 1/00* (2006.01)
*G07G 1/12* (2006.01)
(Continued)

(52) U.S. Cl.
CPC .............. *G06Q 20/204* (2013.01); *G06F 1/163* (2013.01); *G06Q 20/08* (2013.01); *G06Q 20/10* (2013.01); *G06Q 20/20* (2013.01); *G06Q 20/202* (2013.01); *G06Q 20/208* (2013.01); *G06Q 20/32* (2013.01); *G07G 1/0036* (2013.01);

(Continued)

(58) Field of Classification Search
None
See application file for complete search history.

(56) References Cited

U.S. PATENT DOCUMENTS

| 3,978,318 A | 8/1976 | Romeo et al. ............... 250/566 |
| 4,593,186 A | 6/1986 | Swartz et al. ............ 235/462.36 |

(Continued)

FOREIGN PATENT DOCUMENTS

WO    WO 0209054 A2 *  1/2002  ............... G07G 1/00

OTHER PUBLICATIONS

"PAYware Mobile Enterprise" found at http://www.verifone.com/products/hardware/mobile/payware-mobile-enterprise.
(Continued)

*Primary Examiner* — F. Ryan Zeender
*Assistant Examiner* — Allen Chein
(74) *Attorney, Agent, or Firm* — Ernest D. Buff & Assoc. LLC; Ernest D. Buff; Margaret A. LaCroux, Esq.

(57) ABSTRACT

A retail store purchasing system has a plurality of wearable mobile scanner systems with mobile tablet devices integration capability therein adapted to be carried by employees. Each wearable mobile scanner system comprises a mobile tablet device attached to a wearable base housing directly below it, and connected by a base mount universal receiver with rotational coupling. The Main PCB has an EEPROM controlling operations of a USB scanner and MSR. The mobile tablet device has an application which allows wireless communication with a POS store systems server and also commands the EEPROM. A product to be purchased is scanned by activating a button associated with said wearable mobile scanner system. This scanned data is received through the Main PCB to the mobile tablet device USB port and is sent wirelessly to the POS store systems server to obtain product data concerning description, price, inventory and promotions.

7 Claims, 5 Drawing Sheets

(51) Int. Cl.
*G07G 1/14* (2006.01)
*G06Q 20/08* (2012.01)
*G06Q 20/10* (2012.01)
*G06Q 20/20* (2012.01)
*G06F 1/16* (2006.01)
*G06Q 20/32* (2012.01)

(52) U.S. Cl.
CPC ............... *G07G 1/0081* (2013.01); *G07G 1/12* (2013.01); *G07G 1/14* (2013.01)

(56) References Cited

U.S. PATENT DOCUMENTS

| | | | |
|---|---|---|---|
| 4,766,299 A | 8/1988 | Tierney | 235/426.21 |
| 4,916,441 A | 4/1990 | Gombrich | 345/169 |
| 4,935,610 A | 6/1990 | Wike, Jr. | 235/462.44 |
| 4,970,379 A | 11/1990 | Danstrom | 250/205 |
| 5,191,197 A | 3/1993 | Metlitsky et al. | 235/462.44 |
| 5,272,324 A | 12/1993 | Blevins | 235/462.44 |
| 5,324,922 A | 6/1994 | Roberts | 235/375 |
| 5,329,106 A | 7/1994 | Hone et al. | 235/462.44 |
| 5,587,577 A * | 12/1996 | Schultz | 235/462.44 |
| 6,853,293 B2 | 2/2005 | Swartz et al. | 340/5.92 |
| 7,010,501 B1 | 3/2006 | Roslak et al. | 705/23 |
| 7,913,912 B2 | 3/2011 | Do et al. | 235/472.01 |
| 8,235,289 B2 | 8/2012 | Hsu et al. | 235/383 |
| 8,235,294 B2 | 8/2012 | Miller et al. | 235/472.02 |
| 8,250,187 B2 | 8/2012 | Cacheria, III et al. | 709/221 |
| 8,255,499 B2 | 8/2012 | Cacheria, III et al. | 709/221 |
| 8,255,500 B2 | 8/2012 | Cacheria, III et al. | 709/221 |
| 2008/0113814 A1 | 5/2008 | Osburn | 463/42 |
| 2011/0001695 A1* | 1/2011 | Suzuki et al. | 345/156 |
| 2012/0072350 A1 | 3/2012 | Goldthwaite et al. | 705/44 |
| 2012/0209749 A1 | 8/2012 | Hammad et al. | 705/27.1 |
| 2012/0223143 A1 | 9/2012 | Turbovich | 235/472.02 |
| 2012/0284131 A1 | 11/2012 | Soffer et al. | 705/17 |
| 2012/0296741 A1 | 11/2012 | Dykes | 705/14.53 |
| 2012/0298740 A1 | 11/2012 | Hsu et al. | 235/375 |
| 2013/0030933 A1 | 1/2013 | Talach et al. | 705/17 |
| 2014/0330656 A1* | 11/2014 | Zhou et al. | 705/16 |

OTHER PUBLICATIONS

"Infinite Peripherals IPC_Infinea_Tab_Spec.pdf" found at http://www.ipclineapro.com/infinea-tab-ipad/.

* cited by examiner

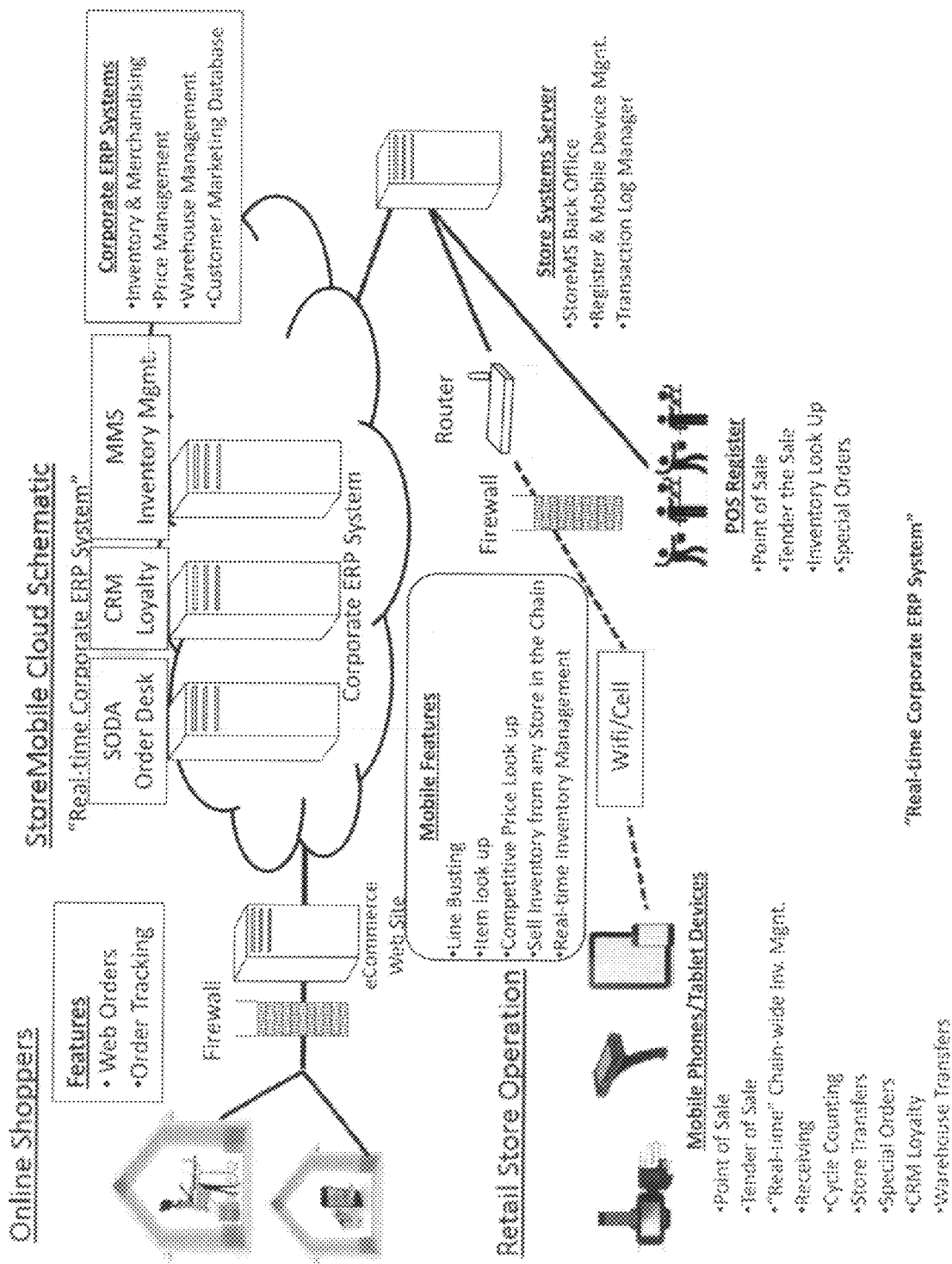

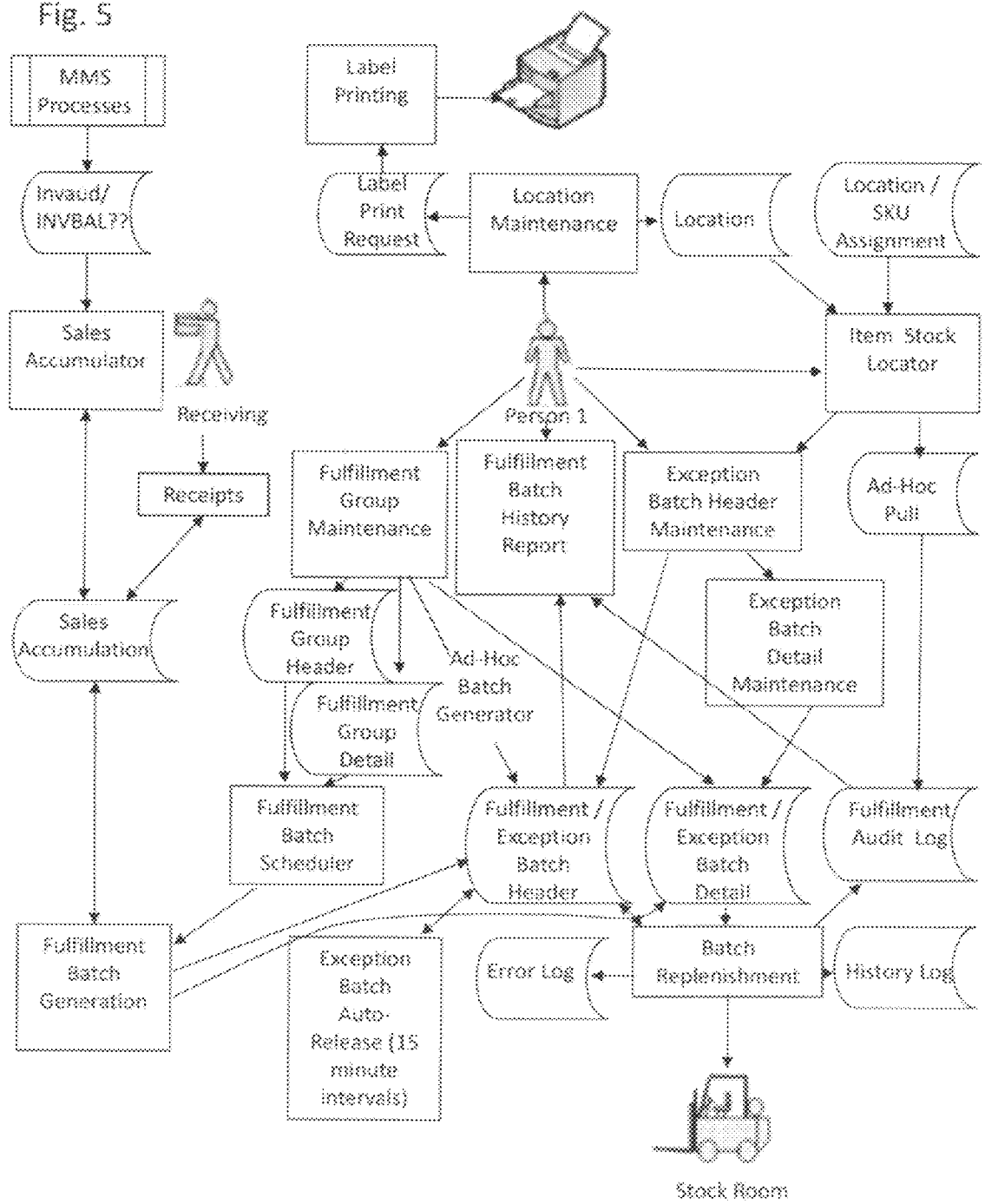

WEARABLE MOBILE SCANNER SYSTEM WITH MOBILE TABLET HAVING A MOBILE POS AND ENTERPRISE RESOURCE PLANNING APPLICATION FOR POS CUSTOMER ORDER FULFILLMENT AND METHOD IN STORE INVENTORY MANAGEMENT FOR RETAIL ESTABLISHMENT

CROSS-REFERENCE TO RELATED APPLICATIONS

This is Nonprovisional Patent Application is related to Applicant's U.S. Nonprovisional Application entitled "Mobile Scanner Gun System With Mobile Tablet Having A Mobile Pos And Enterprise Resource Planning Application For Pos Customer Order Fulfillment And In Store Inventory Management For Retail Establishment" (application Ser. No. 13/783,058); U.S. Nonprovisional Application entitled "Mobile Barcode Scanner Gun System With Mobile Tablet Device Having A Mobile Pos And Enterprise Resource Planning Application For Customer Checkout/Order Fulfillment And Real Time In Store Inventory Management For Retail Establishment" (application Ser. No. 13/783,089); U.S. Nonprovisional Application entitled "Wearable Mobile Scanner System With Mobile Tablet Having A Mobile Pos And Enterprise Resource Planning Application For Pos Customer Order Fulfillment And In Store Inventory Management For Retail Establishment" (application Ser. No. 13/783,119); and U.S. Application entitled "Store Mobile Cloud Application System For Inventory Management And Customer Order Fulfillment And Method For Retail Establishment" (application Ser. No. 13/783,127), which Nonprovisional applications are co-pending and filed on the same date herewith, and the disclosures of which copending nonprovisional applications are hereby specifically incorporated herein by reference thereto.

This Nonprovisional Patent Application claims benefit of Applicant's U.S. Provisional Application Ser. Nos. 61/751,907, filed Jan. 13, 2013, the disclosure of which is hereby specifically incorporated in its entirety by reference thereto.

1. FIELD OF THE INVENTION

The system and method of the present invention relates to sales transactional systems; and, more particularly to software systems implemented by barcode readers, inventory and point of sale devices for use in retail establishments.

2. DESCRIPTION OF THE PRIOR ART

Current retail systems utilize various types of barcode readers, tablets, register stations and Point-of-Sale (POS) devices. For example, one particularly common type of barcode reading device is that used at the checkout register or register station of a store, displaying the price of an item to the checkout clerk, who can then process the sale. Other frequently utilized barcode reading devices can be found at various kiosks in a store wherein a customer can scan an item for a price-check, however these kiosk barcode reading devices do not process the sale, and only provide the ability to view the price of the item scanned. Generally, the check-out counter or register station is in a central location and customers typically must line up at the checkout register bringing with them all the products to be purchased. As the register stations are the only means for the POS transaction, customers are required to wait, often in a line, to checkout via either self-checkout at a register station or at a traditional check-out register operated by an employee of the retail establishment. However, these barcode scanning devices and software implemented therein, fail to provide a combination of mobile technology with POS technology, and further fail to provide the ability to manage inventory throughout the retailer's franchise.

Another type of barcode reading device is a mobile handheld scanner, which is used by store and warehouse associates to manage inventory tasks such as physical inventory, cycle counting, inventory receiving, store to store transfers, return to vendor and product ticketing. However, these devices are only used for inventory management and have no ability to process sales.

Various systems and devices heretofore disclosed and utilized are set forth hereinafter.

U.S. Pat. No. 6,853,293 to Swartz et al. discloses a wearable communication system. A portable data input or computer system includes an input/output device such as a keyboard and a display, as well as another data input device such as an optical barcode scanner, and a data processor module. To scan barcode type indicia, the operator points the scanner at the barcode and triggers the scanner to read the indicia. Each of the system components is distributed on an operator's body and collectively form a personal area system (PAS). Components may include a scanner or imager, a wrist unit, a headpiece including an eyepiece display, speaker and a microphone. Components within a particular PAS communicate with each other over a personal area network (PAN). Individual PASs may be combined into a network of PASs called a PAS cluster. PASs in a particular PAS cluster can communicate with each other over another wireless communication channel. Individual PAS can gain access to a Local Area Network (LAN) and/or a Wide Area Network (WAN) via an access point. Individual PASs can use devices, such as servers and PCs situated either on the LAN or the WAN to retrieve and exchange information. Individual PAS components can provide automatic speech and image recognition. PAS components may also act a telephone, a pager, or any other communication device having access to a LAN or a WAN. Transmission of digitized voice and/or video data can be achieved over an Internet link. The wearable communication system has a CPU and communicates by wireless communication with a trigger worn elsewhere. No tablet is provided, and the system does not communicate barcode information or payment card information wirelessly to a main computer in a retail environment.

U.S. Pat. No. 7,010,501 to Roslak et al. discloses a personal shopping system. The personal shopping system is designed for combined use in both the home of a user and a shopping establishment. The system includes a host computer which is coupled to a host modem and, optionally, to at least one wireless multi-access point. The portable terminal can be used in both the shopping establishment and the home of the user. It is configured to read barcodes associated with items related to shopping, and includes a memory, a barcode reader, a wireless transceiver, and a data interface. The data interface of the terminal communicates with a data interface of the shopping establishment kiosk cradle or directly with the shopping establishment's communications network. This portable terminal communicates with a kiosk and has a very limited range of communication. The portable terminal has a barcode scanner but does not transmit scanned barcode data to a central corporate Enterprise Resource Planning (ERP) system in the retail shopping establishment. Moreover, the portable terminal does not have a tablet or an input device, and does not accept swiping of a magnetic payment card.

U.S. Pat. No. 7,913,912 to Do et al. discloses on-demand point-of-sale scanner access. The access system associates or disassociates a mobile point-of-sale scanner device with a particular shopper. Shoppers may be identified, for example, using biometrics or by scanning a loyalty card. As an example of using biometrics, the shopper's fingerprint may be scanned at the same time as a trigger of the scanner is activated to scan an item's barcode. The fingerprint is preferably transmitted, along with the scanned barcode, to a server or other device for comparison to previously-stored information. The scanner is then automatically associated with the shopper to whom the fingerprint corresponds. In another embodiment, scanned loyalty card information is preferably transmitted (optionally, along with a scanned barcode), such that the scanner is then automatically associated with the shopper to whom the loyalty card corresponds. Disassociating the scanner from a shopper is preferably triggered using a sensor (such as a light) that forms part of the scanner device, whereby the sensor is activated when the shopper releases the scanner device. A timer may be used to filter out accidental activation of the sensor. The on-demand point-of-sale scanner access employs a procedure that merely associates the biometric data of the user with a scan gun that is used for scanning an item to be purchased. Since the biometric data of the user is previously stored in the main computer, the purchase of the scanned item is added to the list of purchased items. The scanning operation is not carried out by the employee of a retail establishment, and the details of the product are not presented to the customer. Merely scanning an object adds the scanned object to the purchased list, and the customer has no means to delete the item from the purchased list. The scanner does not have a tablet attached thereto.

U.S. Pat. No. 8,235,294 to Miller et al. discloses an accuracy-enhanced scanner. This accuracy-enhanced scanner provides, in response to a first user input, illumination of potential scan targets and, in response to a second user input, scans a selected scan target. The user employs the illumination to aim the scanner at the selected scan target in between providing the first and the second user inputs. The scanner has switches to communicate the user inputs, to specify an operating mode for the scanner, and/or to communicate information codes to a computing device. The scanner has one or more scan engines (such as a barcode reader or an RFID tag reader), and optionally communicates wirelessly with the computing device. A scanning system including the scanner optionally provides feedback to the user based on feedback from a host processor. The scanner is any of a Multi-Mode Ring Scanner (MMRS), a cordless hand scanner, or a Personal Digital Assistant (PDA) with an add-on scanner Scanners of various types are mounted on a ring powered by a wrist worn device. The device does not have a tablet attached to an input device. Even though the ring is said to have a magnetic card reader, there is no indication where this operation can be carried out.

U.S. Pat. Nos. 8,250,187, 8,255,499 and 8,255,500 to Cacheria III, et al. disclose a distributed transaction system. This system is operative to interface predetermined services to a user at a fixed location, and includes a processing platform running an operating system. Also included are pluralities of physical system resource interfaces for interfacing with available physical system resources. The physical system resources allow a user to gain access to the predetermined desired services. The system further includes a data store for storing configuration information that enables the operating system to interface with the available physical system resources through the physical system resource interface associated therewith. A communication resource for interfacing with the operating system allows communication of the operating system with a central office for downloading configuration information to selectively enable ones of the available physical system resources to interface with the operating system through associated ones of the physical system resource interfaces in accordance with the configuration information and the predetermined service selected by a user. A plurality of configurations is stored in the data store, and each is associated with a predetermined service and one or more of the available physical system resources. Each physical system resource interface is uniquely associated with a defined one of the physical system resources. This method has a number of terminals or service providers interacting with a central processor, which can communicate with banks and other financial institutions authorizing payment purchases. While verification of customer at terminal 110 is indicated, '110' is not an employee present on the retail store environment. Also, the terminals are not associated with a barcode scanner and/or mobile tablet device having barcode scanning and magnetic stripe reader (MSR) features. There is no employee in the retail location that has a barcode scanner scanning a particular object of interest to a customer, to provide full details of the product, its price and available promotions.

U.S. Patent Application Publication No. 20120209749 to Hammad et. al. discloses a snap mobile payment apparatus, methods and systems. This snap mobile payment (SNAP) system transforms real-time-generated merchant-product Quick Response (QR) codes via SNAP components into virtual wallet card-based transaction purchase notifications. In one embodiment, the SNAP obtains a snapshot of a QR code presented on a display screen of a point-of-sale device from a mobile device. The SNAP decodes the QR code to obtain product information included in a checkout request of the user, and merchant information for processing a user purchase transaction with a merchant providing the QR code. The SNAP accesses a user virtual wallet to obtain user account information to process the user purchase transaction with the merchant. Using the product information, merchant information and user account information, the SNAP generates a card authorization request, and which the SNAP provides to a payment network for transaction processing. Also, the SNAP obtains a purchase receipt confirming processing of the user purchase transaction. The snap mobile payment apparatus, methods and systems require the user to present the QR code and the virtual wallet to make a purchase. This requires the customer to take a picture of the QR code and show it at the sales kiosk register or bring the product to the sales kiosk, a cumbersome operation. There is no employee in the retail location that has a barcode scanner with a tablet adapted for scanning a particular object of interest to a customer, to provide full details of the product, its price and available promotions.

Non-Patent Literature "Infinite Peripherals IPC_Infinea_Tab_Spec.pdf" at http://ipclineapro.com/infinea-tab-ipad/discloses a tablet that is attached to a swivel head and has an application for barcode scanning, magnetic card reading. The IPC Infinea Tab is clearly a stand for attaching a tablet. The Infinea tab has active scanning, active barcode reader, and active search magnetic card reader. It has two buttons for starting the scan operation. It is not indicated to receive a command from a barcode scanner to scan a barcode or read a magnetic card. Further, the Application in the tablet does not communicate with a central corporate ERP system within the retail location to determine detailed description of a scanned product; determine its inventory, price and promotions. Furthermore, it does not also allow the POS store systems server to process a payment card transaction for the purchase of a product.

U.S. Pat. No. 3,978,318 to Romeo et al. discloses a hand-operated scanner having an inverted T-shaped extension for slideably receiving two adjacent fingers for manipulating the scanner and simultaneously allowing the operator's fingers to remain free for merchandise packaging, merchandise checkout and/or making keyboard entries by artful placement of the extension in relation to the scanner reading head. No tablet is provided, and the system does not communicate barcode information or payment card information wirelessly to a main computer in a retail environment.

U.S. Pat. No. 4,593,186 to Swartz et al. discloses an entirely field-portable laser scanning system for reading barcode symbols includes a light-weight and small-sized laser scanning head. The laser source, power supply component, optics, scanning elements, sensor circuit, and signal processing circuitry are specially designed for minimal size and weight and volume such that they can all be mounted in the head. The head can be bracket-mounted or hand-held. The housing for the head can be provided with a handle grip, or can be gun-shaped. High-speed oscillating scanning motors and/or penta-bimorph scanners are used as scanning elements. A trigger initiates repetitive scanning of each object bearing a symbol, and an indicator indicates when the scanning of that particular object has been terminated. A body harness supports the remaining scanner system circuitry. A non-bulky, freely-movable cable interconnects the head to the body harness. Methods of scanning the symbol and of operating the system are also disclosed. No tablet is provided, and the system does not communicate barcode information or payment card information wirelessly to a main computer in a retail environment.

U.S. Pat. No. 4,766,299 to Tierney discloses a hand worn laser barcode reader scanner device is of compact design and adapted to be worn comfortably on the back of the hand of the user. A switch associated with the laser is attached to a hand strap such that the barcode reader is switched on and off by deliberate flexure of muscles in the user's hand. This enables the user to point his hand in a natural manner toward the barcode subject matter to be read, and, through the automatic switch, frees the fingers of his hand for use on other operations without removal of the laser device from the hand. No tablet is provided, and the system does not communicate barcode information or payment card information wirelessly to a main computer in a retail environment.

U.S. Pat. No. 4,916,441 to Gombrich discloses a handheld pocket terminal (22) having a display screen (40) and a barcode reader (42). No mobile tablet device is provided, and the system does not communicate barcode information or payment card information wirelessly to a main computer in a retail environment.

U.S. Pat. No. 4,935,610 to Wike Jr. discloses a portable optical barcode reader is adapted to be attached to the underside of the wrist of the user for reading coded labels on a purchased merchandise item. A ring member mounted on one of the fingers of the user has an actuating member mounted therein which is actuated by another finger of the user to enable the barcode reader to read a coded label. Scanning device mounted within the barcode reader provide a compact arrangement for generating a scanning light beam which scans the coded label. The barcode reader is attached to the wrist of the user by an easily removable strap member. No tablet is provided, and the system does not communicate barcode information or payment card information wirelessly to a main computer in a retail environment.

U.S. Pat. No. 4,970,379 to Danstrom discloses a wand type barcode scanner. The scanner circuit includes a first control loop for reducing the LED driving current as the D.C. voltage level supplied to the digitizer tends to exceed a selected D.C. reference value; a second control loop becomes active when the LED is shut off by the first control loop, e.g. in the presence of sunlight. The second control loop controls the gain of the scanner amplifier so that the D.C. reference level at the input to the digitizer circuit is maintained as the scanner scans barcodes in the presence of sunlight but with the LED de-energized. No tablet is provided, and the system does not communicate barcode information or payment card information wirelessly to a main computer in a retail environment.

U.S. Pat. No. 5,191,197 to Metlitsky et al. discloses a hands-free scanning system for reading indicia having parts of different light reflectivity, including a housing having a window and an actuatable electro-optical scanner in the housing for projecting a light beam through the window to indicia to be read, for scanning the indicia. The system further detects light of variable intensity that is reflected off the indicia to generate an electrical signal representative of the indicia. The housing is mounted on an arm of an operator and the scanner initiates reading of the indicia upon movement of the operator's hand relative to the arm by means of an actuator switch. No tablet is provided, and the system does not communicate barcode information or payment card information wirelessly to a main computer in a retail environment.

U.S. Pat. No. 5,272,324 to Blevins discloses a hands free radio frequency terminal is worn on the body of the user. Components comprised of barcode scanner, keypad for communicating with a computer and LCD/LED display are attached to a sleeve device detachably worn on the forearm, and includes a switch for operating the scanner that is worn across the palm of the hand on a stirrup device. A power pack and radio frequency transceiver is worn on the torso of the user and is interconnected by conductors to the components. The RF transceiver has communication with a host computer. No tablet is provided, and the system does not communicate barcode information or payment card information wirelessly to a main computer in a retail environment.

U.S. Pat. No. 5,329,106 to Hone et al. discloses a scanning system utilizing a scanner which is located in a case of size adapted to fit in the palm of the hand or to be attached to the hand along the top outside surface of the hand between the fingers and the wrist. The scanner includes a scan engine within the case mounted on a printed circuit board which scans symbols having data identifying characteristics, which are visible through a window in a side wall of the case. A switch for enabling scanning operations may be provided by a manually actuated trigger on the printed circuit board and an arm which is pivotally mounted on a post which aligns the scan engine in the case and is captured in an opening along a wall of the case. The scanner may be connected by a retractable cable to a retraction unit which can be carried by the operator. The system may be configured with the scanner on the outer side of the hand and held on the hand as by a strap or glove. A light weight arm unit is carried on the forearm. A terminal may be carried by the operator as on his or her belt. The arm unit has an outside or top surface with a keypad and display. The keypad enables the system to be turned on and off and for data to be entered which is transferred to the terminal. Passages in the arm unit are provided for cables which connect the scanner to the arm unit and the arm unit to the terminal. No tablet is provided that can readily be mounted and dismounted from the device for use with different devices, and the system does not communicate barcode information or payment card information wirelessly to a main computer in a retail environment.

U.S. Patent Application Publication No. 20120223143 to Turbovich discloses a wireless product barcode reader comprises a scanner for scanning product codes; processing electronics for providing a raw signal proportional to signal intensities detected while scanning the product code; a wireless interface for providing said raw signals to a receiving unit; and a mounting unit for mounting said barcode reader on the body of a user for hands free use. The scanner may be an optical scanner for scanning barcodes. No tablet is provided that can readily be mounted and dismounted from the device for use with different devices, and the system does not communicate barcode information or payment card information wirelessly to a main computer in a retail environment.

U.S. Patent Application Publication No. 20080113814 to Osburn discloses systems and methods are provided for setting up a networked gaming system comprising a plurality of gamine devices utilizing barcoded player tracking modules and a hand-held smart barcode scanner According to this method, the barcode on a player tracking module can be scanned by the hand-held smart barcode scanner, additional data can then be entered into the barcode scanner and associated with the barcode stored in the barcode scanner. A central computer system is installed for controlling the plurality of gaming devices. The player tracking modules in the gaming devices are connected to the central computer system. After the central computer system is active and online, the barcode and associated data stored in the barcode scanner can be downloaded to the central computer system for the central computer system to control and communicate player tracking data with the player tracking modules. No tablet is provided that can readily be mounted and dismounted from the device for use with different devices, and the system does not communicate barcode information or payment card information wirelessly to a main computer in a retail environment.

U.S. Pat. No. 8,235,289 and U.S. Patent App. Pub. No. 20120298740 to Hsu et al. disclose point of sale terminals generally including a housing including at least first and second housing portions which are arranged for relative axial movement from a closed position to an open position, the first housing portion including at least a communications interface adapted for operative communications engagement with a mobile communicator and a first housing portion socket adapted for partially surrounding the mobile communicator, the second housing portion including a second housing portion socket adapted for partially surrounding the mobile communicator and the first and second housing portions being configured such that when they are arranged in the closed position the first housing portion socket and the second housing portion socket together hug the mobile communicator and prevent unwanted disengagement of the mobile communicator therefrom. The point of sale terminals do not provide inventory management in conjunction with point of sale transaction capability throughout a retailer establishment. Furthermore, the terminals are specifically constructed to receive and house a phone device such as that commonly sold under the trade name iPhone. Consequently, the terminals are limited in structure and function to use with narrowly tailored constructs. What is more, the terminals provide for a magnetic card swiping device integrated within the terminal body itself, and as a result the phone device must be mounted within the particular terminal to carry out the point of sale transaction.

U.S. Pat. No. 5,324,922 to Roberts discloses an apparatus for managing a transaction using a transaction terminal having a manual code reading device, such as a barcode reader, for reading a data code printed on a visual medium. A transaction program forming part of the system includes at least one page of a visual medium having a first and second sets of data codes printed thereon. The first set of data codes in printed in a prearranged sequence and comprises a predetermined sequence of program commands for carrying out all of the steps of a prearranged transaction, including a subset of program commands associated with a corresponding subset of data entry steps. The second set of data codes is printed on the same or another page of said visual medium. Each of the data codes in the second set comprises a prearranged item of transaction data for use in said data entry steps. The transaction terminal includes a computer means interfaced to the manual code reading means. This computer means includes a program storage device and a data storage device. The apparatus relates to managing transactions of the type involving home shopping, bill paying and the like, and does not relate in structure or function to mobile point of sale systems for use in retail establishments. As such, the point of sale terminal does not provide a mobile tablet device capable of being mounted on a scanner device for integration and communication for sales transactions and inventory management.

U.S. Patent Application Publication No. 20130030933 to Talach et al. discloses a payment facilitating system for use with a mobile communicator and a point of sale (POS) terminal, the system including a Near Field Communication (NFC) financial transaction communication link between the mobile communicator and the POS terminal, the NFC financial transaction communication link being operative to communicate NFC data for use in a financial transaction, a non-NFC financial transaction communication link between the mobile communicator and the POS terminal, the non-NFC financial transaction communication link being operative to communicate non-NFC data for use in the financial transaction, and a transaction effector operative to complete the financial transaction using both the NFC data communicated directly between the mobile communicator and the POS terminal over the NFC financial transaction communication link and the non-NFC data communicated directly between the mobile communicator and the POS terminal over the non-NFC financial transaction communication link. The payment facilitating system relates to NCF data transmission for payment at a POS terminal via NCF data programmed with a user's cell phone or smart phone device to provide payment at the checkout via the cell phone. The system does not relate in structure or function to mobile point of sale systems for use in retail establishments.

U.S. Patent Application Publication No. 20120296741 to Dykes discloses a payment system including a transaction server, a virtual wallet server (VWS), at least one point of sale device including a secure element and being operative to provide secure data communication of a purchaser wallet personal identification number (WPIN), but not purchaser payment particulars, to at least the VWS and at least one mobile communicator communicating a mobile communicator presence indicator (MCPI) but neither the purchaser WPIN nor the purchaser payment particulars to the at least one point of sale device. The payment system relates utilizing a mobile device at the register counter of a retail establishment for data transmission of payment with the mobile device. The system does not relate in structure or function to mobile point of sale systems for use in retail establishments.

U.S. Patent Application Publication No. 20120284131 to Soffer et al. discloses a mobile commerce system including a multiplicity of Mobile Device-Point of Sale Communication (MPC)-equipped mobile devices, a plurality of MPC-enabled Point-of-Sale (POS) devices, at least one POS configuration server for configuring the plurality of MPC-enabled POS devices, at least one MPC-equipped mobile device configuration server for configuring the plurality of MPC-equipped mobile devices and at least one mobile marketing platform server operative to introduce Transaction Value Certificate (TVC)-related functions and to communicate both with the at least one POS configuration server and the at least one MPC-equipped mobile device configuration server to coordinate operation thereof so that the MPC-enabled POS devices will be "tap-ready" for carrying out the TVC-related functions. The mobile commerce system is structured having a multiplicity of Mobile Device-Point of Sale Communication (MPC) wallet-equipped mobile devices, typically smart phones such as mobile communicators operating on an ANDROID® (Google), iOS® (Apple), BLACKBERRY® or WINDOWS MOBILE® (Microsoft) operating system, and a plurality of MPC-enabled point of sale (POS) devices, for example, an electronic cash register (ECR), connected to a Near Field Communication (NFC)-enabled payment terminal. The mobile commerce system does not provide a system having a barscanner device integrated and in communication with a mobile tablet with payment card receiving capability. The system does not relate in structure or function to mobile point of sale systems for use in retail establishments.

U.S. Patent Application Publication No. 20120072350 to Goldthwaite et al. discloses a system processes a request by a customer to pay a transaction amount, using the customer's account, for a transaction between the customer and a merchant, to provide a payment to an account of the merchant. The transaction incorporates use of a mobile wireless device operated by the customer to provide identification information of the customer's account to an authentication server. A payment server coupled to the authentication server and the merchant passes merchant communications to the authentication server. The authentication server receives the transaction amount from the merchant and receives customer account information from the customer's wireless mobile device, and processes the transaction and account information and, if authenticated, routes the payment transaction to the payment server for payment to the merchant's account. The system relates utilizing a mobile device at the register counter of a retail establishment for data transmission of payment with the mobile device. The system does not relate in structure or function to mobile point of sale systems for use in retail establishments.

Non-patent literature entitled "PAYware Mobile Enterprise" found at http://www.verifone.com/products/hardware/mobile/payware-mobile-enterprise discloses a mobile payment solution that transforms smartphones and tablets into secure transaction portals. The literature teaches swiping, inserting or tapping a card, to execute payments. In addition, advanced features such as a 2D barcode imager, integrated PIN pad and customizable app integration are provided for merchants who want their store associates to get up from behind the cash register and interact with consumers anywhere in the store. The mobile payment solution does not provide use outside of the store, the devices disclosed fail to provide the ability for use throughout a retailer's establishment, including other locations and warehouses of the retailer.

Despite heretofore disclosed and utilized systems and methods, managing inventory throughout retailer establishments, nationally and internationally, has proven unreliable and difficult. POS capabilities remain separate from inventory management throughout retailer establishments and as a result both retailers and customers are tied to the physical location of the checkout work station, resulting in frustration and loss of sales.

Based on the foregoing, there exists a need for a wearable Wi-Fi/wireless cellular scanner with mobile tablet device utilizing a system and method that communicates daily inventory management such as physical inventory, cycle counting, inventory receiving, store to store transfers, return to vendor, and product re-ticketing, while at the same time providing the ability for POS transactions. Further, there is a need in the art for a system and method that is appointed to be utilized with a mobile portable barcode scanner/2D barcode reader (scanner) and magnetic stripe reader (MSR) devices that can be carried by retail employees in a retail location to provide daily inventory management applications for a full combination of tasks, including physical inventory, cycle counting, inventory receiving, store to store transfers, return to vendor, product re-ticketing, as well as POS applications. Additionally, there is a need in the art for a system and method that can scan the barcode of interest of a customer, provide complete details of the product along with its selling price and taxes, as well as any physical and electronic coupons, promotions, and customer loyalty data and rewards available. Through use of such a novel system, a customer may decide to purchase the object just scanned or look at additional items, and when a purchase decision is made by the customer, an employee can readily process the purchase, providing a courteous friendly sales environment wherein every employee has complete access to all the relevant information on any product of interest and their customer loyalty data and rewards to a customer.

SUMMARY OF THE INVENTION

The system and method, and devices utilizing same, of the present invention provide a wearable mobile Wi-Fi/wireless cellular scanner system (wearable mobile scanner system) with mobile tablet device integration capability therein adapted to be carried by an employee in a retail environment. In turn, the wearable mobile scanner system integration includes several free standing applications that are capable of linking the user to a POS store systems server and a central corporate ERP system, which provides a system and method that executes store level daily inventory management objectives and POS transactions for customer checkout. Uniquely, the method and mobile tablet device provides the ability to carry out daily store level inventory management functions for such tasks as physical inventory, cycle counting, inventory receiving, store to store transfers, return to vendor, product re-ticketing, and to operatively identify a product by its barcode, establish price, taxes, promotions, physical and electronic coupons and customer loyalty data and rewards available and process sale of product to a customer, regardless of the location of the inventory. From within the POS transaction, if the inventory is unavailable in the store, the sold inventory can be transferred from the warehouse, another store or special ordered from the vendor and made available at any store for customer pickup or shipped to a customer location. In the case the inventory is unavailable, once the transaction is completed on the mobile tablet device, the item and quantity of the selected fulfillment location is allocated within the central corporate ERP system.

One such device adapted for use with the subject system and method is a wearable mobile scanner system adapted to receive a mobile tablet device. The wearable mobile scanner system has a mobile tablet device attached to a base device, and connected thereto through a base mount universal receiver with rotational coupling. The upper receiver of the mobile tablet device has an MSR mounted on one edge of the mobile tablet device and the scanner is integrated into the base of wearable frame, the scanner being operable by pressing a trigger provided in the wearable mobile scanner system.

A wearable mobile scanner system, with communication capability of either Wi-Fi or wireless cellular through a standard cellular carrier, for processing a retail store purchase is provided. The wearable mobile scanner system includes a forearm portion and a hand portion. The forearm portion comprises a main body member and at least one strap member, and is adapted to secure the forearm portion upon a user's forearm. The hand portion comprises a central forehand member, a palm member, and at least one finger aperture, wherein the hand portion is aligned with the forearm portion and wherein the hand portion is adapted to receive a hand of the user. A trigger member is located on the side of the forefinger and operated by the thumb in communication with a scanner device mounted on the central back of the forehand member of the hand portion. An MSR is provided for carrying out and processing POS payment card transactions. The main body member of the forearm portion includes an attachment means comprising a base mount universal receiver with rotational coupling adapted to permit changing the orientation of the mobile tablet device in the portrait mode or in the landscape mode of the mobile tablet device display screen and communicate with a mobile tablet device having a system integrated therein that enables store level real-time inventory management and a fully functioning POS for selling merchandise in a retail sales environment and global inventory management.

The wearable mobile scanner system used for processing a customer sale in a retail store further preferably comprises a previously programmed electrically erasable programmable read only memory (EEPROM) controlling all actions of the device and the scanner trigger for activating a scan operation of an item of interest to a customer by an employee of a retail establishment. The scan operation is adapted to cause the EEPROM of the main printed circuit board (Main PCB) to communicate with one of the mobile tablet device applications; therefore, processing the scanned barcode as warranted by the functionality of the application. In operation and function, the customer purchases a product from any retail store employee having the wearable mobile scanner system receiving full product details, price, electronic and physical coupons, promotions and customer loyalty data and rewards from the POS store systems server and charges the purchase in a friendly, efficient, informative atmosphere without having the need to bring the product to a central checkout station and waiting in queue to check out.

The mobile tablet device is encased in a hardened case/shell designed to protect the device against drops and damage. The mobile tablet device includes software readable from the subject system and method and is launched by selecting the appropriate application icon. The system applications have functionality to communicate wirelessly with either the POS store systems server that is present within the store, a central backup POS store systems server located at a central corporate site or the central corporate ERP system. All are primarily connected via Wi-Fi or wireless cellular on the retailer's corporate wide area network and this communication is secured using standard Wi-Fi Protected Access (WPA) and Wi-Fi Protected Access II (WPA2) wireless encryption methods. The application has functionality to order an EEPROM present within the mobile tablet device upper receiver to conduct various functions, and this directive is sent through a specialized universal serial bus wiring harness. The communication between the Main PCB and the mobile tablet device occurs back and forth depending on the particular application function in use.

The EEPROM of the Main PCB carries a programmed instruction set and works in conjunction with the mobile applications of the mobile tablet device. For example if a barcode scan is triggered by the retail store employee according to the interest of a customer, this event is detected by the EEPROM of the Main PCB and is communicated to the mobile application within the mobile tablet device. The EEPROM interprets and parses the barcode read and formats it in a manner that is readily recognized by the POS mobile application running on the mobile tablet device. That application communicates with the POS store systems server to obtain the details of the product scanned, its selling price, physical and electronic coupons, promotions, customer loyalty data and rewards available and the available inventory of the product chain-wide, including the warehouse. The mobile tablet device displays the entire data on the screen and the retail store employee may discuss these details to the customer allowing the customer to make a purchase decision. Optionally, the POS store systems server may suggest other similar products with enhanced functionality, physical and electronic coupons, promotions, customer loyalty data and rewards and the like. Accordingly, the customer may view similar products and review product details to come to a purchase decision. Optionally, if the item is not available in the current store's inventory, the employee may suggest the item be shipped from the warehouse, another store within the chain or special ordered from the vendor.

When the customer reaches a purchase decision of a product displayed on the mobile tablet device screen, the employee of the store presses a software button to invoke the POS application. If shipping is required, the customer provides the customer name, address, contact telephone number, and email address if they are not already in the customer loyalty database. The customer provides a payment card to the retail store employee which is swiped in the MSR slot of the USB input device. The MSR track data is encrypted using industry standard Triple DES with DUKPT by the MSR reader before the data is transferred to the POS application. The employee allows the customer to sign their name on the device, using the signature capture feature of the mobile POS application, to validate the sale. Payment card data received from the customer is securely transferred by wireless communication to the POS store systems server, which processes the customer payment card by contacting a bank card processor via a PCI certified network connection. Upon receiving credit authorization of the purchase, the mobile tablet device of the wearable mobile scanner system displays information that the purchase is complete and the employee bags the merchandise from the completed sale and hands it to the customer. The POS store systems server updates the corporate ERP system, adjusting the inventory on-hand of the merchandise that has been sold and the inventory of each of the items sold have been updated and visible across the retail chain. The POS store systems server sends an email of the receipt to the customer's email address, which may be readily viewed in a smart phone carried by the customer. If desired, a hard copy of the receipt for the purchase is printed on a local printer within the retail establishment via the store's local network.

With this system, the customer does not have to bring the merchandise to a central check out location. The purchase operation is conducted at the point-of-sale by a retail store employee wearing a mobile scanner system, and has up to date information concerning product inventory of any item in their retail location or chain-wide, along with current details, physical and electronic coupons, promotions and customer loyalty data and rewards.

The following paragraph details the elements, which collectively enable operation of the system as detailed hereinabove. The mobile tablet device (upper receiver) of the wearable mobile scanner system preferably comprises a custom-developed, industry hardened mobile tablet device utilizing a base mount universal receiver with rotational coupling to connect to the wearable base housing and a specialized universal serial port wiring harness to connect to the USB input devices. Various operating systems, such as those associated with the trade name Android (Google), iOS (Apple), and Windows (Microsoft) are contemplated. The mobile tablet device has custom programmed mobile applications on the Android platform. The mobile tablet device (upper receiver) is connected to several base housing concepts, each with a scanner USB input device integrated into the base, except the handheld platform, which has the scanner incorporated into the mobile tablet device (upper receiver). The base mount universal receiver with rotational coupling permits changing the orientation of the mobile tablet device in the portrait mode or in the landscape mode of the mobile tablet device display screen. Further, the mobile tablet device has two rotational positions on the forearm. One position is flat on the back of the forearm and the other is on the inside edge of the forearm for ease of operation. The upper receiver has an industry standard USB MSR input device integrated along the short edge of the mobile tablet device for easy access by the user regardless of which base housing is selected for use. The scanner button is located either at the base of the palm accessed by the middle fingers or along the side of the forefinger, accessed by the thumb.

A key feature of the invention is an EEPROM that has a previously programmed instruction set present within the Main PCB. The EEPROM of the Main PCB is connected to the mobile tablet device and can process the commands issued by the mobile applications to command either the barcode scanner or the MSR to acquire required data. The EEPROM of the Main PCB organizes the data in proper format and delivers it to the mobile tablet device through a specialized universal serial bus wiring harness. Due to the use of the EEPROM, which can process barcode and payment card information, the attached mobile tablet device can perform secure distributed sales within a retail establishment or extend its operation beyond its walls in a remote location through the use of wireless cellular connectivity. Each of the employees of the retail establishment knows instantaneously the inventory of any particular item chain-wide, the barcode of an item that is scanned along with its price as well as discounts. Thus a customer may look at several product items and ask the employee of the retail organization to know its price, details concerning the item, electronic or physical coupons, promotion and customer loyalty data and rewards. This provides a pleasant, informative interaction between the customer and the employee of the retail organization, establishing one-on-one, face-to-face relationship, which is appreciated by the customer and results in an improved sales environment.

In its preferred embodiment, the wearable mobile scanner system of the present invention comprises:

i) a mobile tablet device having Wi-Fi communicative capability to the POS store systems server and the corporate ERP system in a retail store attached to a wearable base housing through a base mount universal receiver with rotational coupling, forming a wearable mobile scanner system worn by an employee in a retail store;

ii) a mobile tablet device having wireless cellular communicative capability to the POS store systems server, centrally located backup POS store systems server and the corporate ERP system, in a retail store attached to a wearable base housing through a base mount universal receiver with rotational coupling, forming a wearable mobile scanner system worn by an employee in a retail store;

iii) said mobile tablet device having application software capable of commanding an EEPROM present in the Main PCB to acquire barcode scan or obtain payment card information from a swiped payment card;

iv) said USB scanner input device having a scanner button for activating a scan operation by an employee of a retail establishment, at which point the EEPROM of the Main PCB communicates with said mobile tablet device, launching said application software to get the mobile tablet device ready for received barcode;

v) said USB MSR input device having the ability to process customer payment card data by an employee of a retail establishment, at which point the EEPROM of the Main PCB communicates with said mobile tablet device, processing customer payment card data through the proper secured bank card processing network through the POS store systems server;

vi) said mobile POS application software communicating with said POS store systems (primary or backup) server to obtain detailed information of the product scanned, its inventory, selling price and promotions available;

vii) said employee of the retail establishment communicating to a customer the description, price, promotion data, and customer loyalty data and rewards of each item scanned;

viii) said customer deciding to purchase the item and the employee accessing a sales transaction of said application software, entering customer name, address and e-mail address if needed, and swiping customer data, and said USB MSR input device communicating formatted customer data securely to said POS store systems server;

ix) said POS store systems server contacting a bank card processing authority authorizing said purchase and communicating to the mobile tablet device that the customer has purchased the scanned product;

x) said POS store systems server adjusting said product inventory through the corporate ERP system, sending a receipt for to the e-mail address of the customer and/or printing a hard copy of the transaction on a store network printer;

xi) said mobile tablet device being operative, in the event that said authorization is denied, to inform the employee of this credit denial, so that said customer is informed and can provide alternative payment;

whereby the store employee has the ability to carry out daily store level inventory management functions for such tasks as physical inventory, cycle counting, inventory receiving, store to store transfers, return to vendor, product re-ticketing, whereby the customer purchases a product from any retail store employee having a wearable mobile scanner system receiving full product details, price, electronic and physical coupons, promotions, customer loyalty data and rewards and charges the purchase in a friendly atmosphere without having any need to bring the product to a central checkout station and wait in queue to check out.

BRIEF DESCRIPTION OF THE DRAWING

The invention will be more fully understood and further advantages will become apparent when reference is had to the following detailed description of the preferred embodiments of the invention and the accompanying drawing, in which:

FIG. 4 is an in-depth schematic diagram illustrating an embodiment of the StoreMobile Cloud™ network schematic of the subject system and method;

FIG. 5 is a flow chart diagram illustrating an embodiment of the back room management picture flow of the subject system and method.

DETAILED DESCRIPTION OF THE INVENTION

Figure 1:
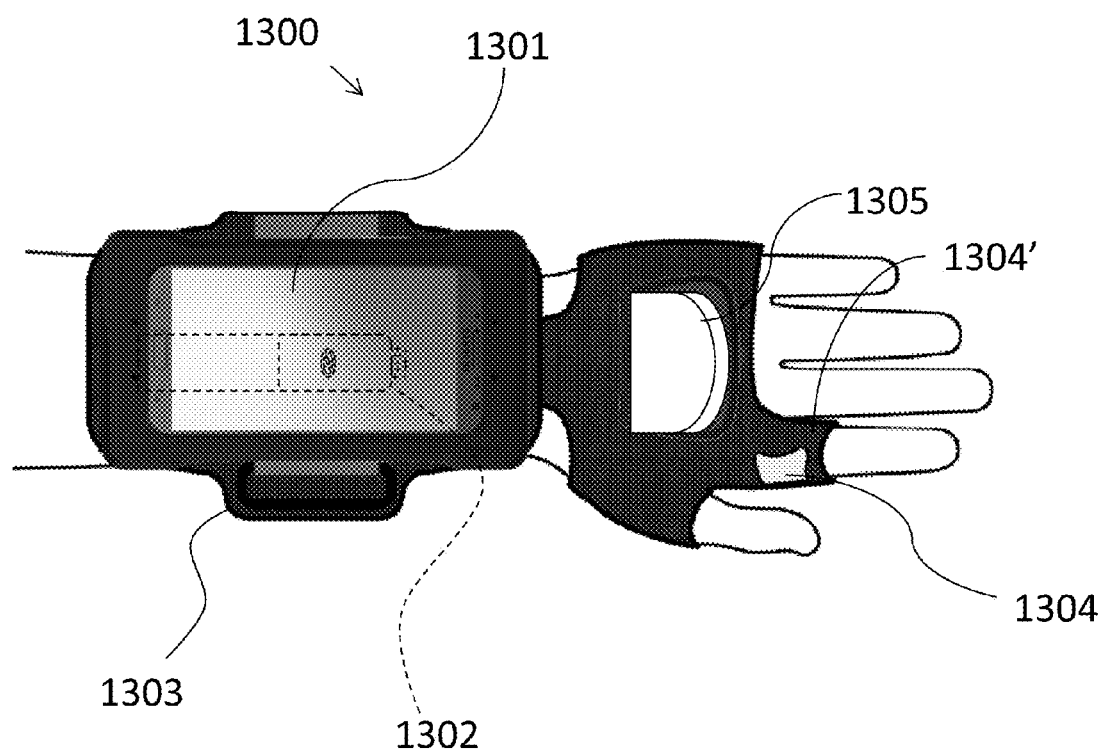
FIG. 1 is a drawing of an embodiment of the wearable mobile scanner system with integration of a mobile tablet device operational with the system and method, shown worn on a user's forearm and hand.

This invention relates to real-time daily store level inventory management and a fully functioning POS system for customer check-out of merchandise in a retail sales environment. The system comprises a mobile tablet device (upper receiver) having a display and an industry standard USB MSR input device integrated along the short edge of the mobile tablet device for easy access by the user and attached to a wearable base housing through the base mount universal receiver with rotational coupling and in communication with a USB scanner input device integrated into the base housing through the specialized universal serial bus wiring harness. The system and method of the present invention provides technology that empowers sales associates to service their customers without consideration to the physical location of the product. Through use of the subject system and methods, goods can be purchased anywhere, anytime and delivered wherever and whenever the consumer wants it. Under current systems and methods, the consumer must travel to the location of the merchandise (or order the merchandise on-line through their personal device and wait for delivery or in store pick-up). This adds an inconvenient step—that is rather than allowing the sales associate to simply handle the purchase via a mobile POS device and have the item delivered where the customer wants, the customer must drive to the other location or place his/her own order through his/her own means. Not only is this inconvenient, but such inconvenience often results in the loss of the sale altogether, as the customer may decide to forego the purchase, or simply move on to the competitor's store if it is nearby and convenient to do so or purchase the item on the Internet.

None of the heretofore systems and methods provide the ability for a retailer to utilize software and hardware that runs the entire store, ranging from real-time inventory management, to POS customer check-out transactions. The system, method and devices herein provide this unique advantageous feature. The subject system and method, and devices implementing same, provide the following advantages: 1) increased store productivity, 2) reduced technology cost and footprint, and 3) improved customer satisfaction, all of which in turn ensures return on investment (ROI).

ERP systems integrate internal and external management information throughout an organization, embracing finance/accounting, manufacturing, sales and service, customer relationship management (CRM), etc. ERP systems automate this activity with an integrated software application. The purpose of ERP is to facilitate the flow of information between all business functions inside the boundaries of the organization and manage the connections to outside stakeholders. ERP systems can run on a variety of computer hardware and network configurations, typically employing a database as a repository for information. Examples of vendors who build industry leading ERP systems include: JDA Software Group, Oracle, SAP, Epicor, etc. However, present systems do not provide the ability for a store employee at a physical store location to have direct mobile access to real-time inventory management and POS capability.

The subject system and methods provides real-time inventory management and POS to retail establishments that complement current merchandising systems generally utilized by businesses. Real-time mobile functionality is provided by the subject system and methods, preferably built for MMS users from POS to MMS in their current MMS iSeries environment. Through use of the subject system MMS iSeries environment, businesses can build their own cloud to provide mobile customer check-out/order fulfillment and real-time inventory management in the store through the wearable mobile scanner system.

Uniquely, the subject system and method uniquely provides the ability to use a mobile tablet device in a store to yield the following benefits: 1) it allows sales associates to service customers in new ways that deepen customer loyalty and increase wallet share; 2) it provides inventory management for increased accuracy, efficiency, and accountability while providing real-time access to corporate inventory data; 3) it eliminates workflow in the back office and keeps the retailer's sales associates on the sales floor; and 4) it results in higher customer satisfaction. Implementation of the subject system and methods, and devices thereon implemented provides strong inventory management, and leveraging current technology infrastructure ensures ROI.

Advantageously, the subject system, method and devices of the present invention allow a sales associate using a mobile tablet device anywhere in the store, or beyond the store, to carry out inventory management tasks such as: a) Daily Cycle Counting & Physical Inventory, b) Receiving & Returns, c) Store Transfers, d) Item Checking, e) Re-Ticketing, etc. Such tasks are performed real time within the ERP system and are all visible chain-wide. Further, the sales associate can run POS on the sales floor, with all the capability previously contained at the POS terminal. Through use of the subject system and method, a sales associate can perform the following from a mobile POS device: i) sell "out of stock" product available in the warehouse, another store or from a vendor; ii) create a purchase order (PO) or transfer within MMS and track that item transfer on the web; iii) sell products from their e-commerce site; iv) combat "Showrooming" by providing customers real-time competitive product and pricing information, allowing staff to match prices and satisfy their customer's demands by exceeding expectations at the point of purchase, which is throughout the store and beyond its walls.

Mobile POS represents the forefront of retail stores. For decades retail stores have been designed around cash-wrap POS stations/register stations. New studies indicate that cash-wrap POS stations/register stations are becoming less relevant in future retail markets. Approximately one fifth (21.4%) of retailers are planning on removing or decreasing use of traditional fixed-station POS/register stations per store. In many retail verticals, mobile POS will eventually replace these systems. As mobile tablet devices mature and harden, the need for POS register stations, terminals and smart RF scan guns with cryptic processes will continue to dwindle.

However, today's typical RF data terminals fall short; although many are durable and retail hardened, and work well for inventory, they are ineffective on sales floor due to lack of functionality and usability. Moreover, conventional enterprise RF data terminals are very expensive and typically locked into outdated technology. Although "consumer grade" mobile tablet devices appear to have some potential to fill this gap, these devices lack industrial durability, hardware integration, and retail specific software and functionality.

The system and method of the present invention provides implementation within a wearable mobile scanner system that performs all the necessary real-time store level inventory management functions and utilize the Internet to provide competitive analysis, thus determining product pricing for the customer and transacting the sale accordingly. The system, method, and devices of the present invention 1) match the exceptional "work flow" performance of legacy radio frequency (RF) data terminal for inventory management, 2) match the transaction speed of the POS terminal found in a high volume retail store, 3) are Payment Card Industry (PCI) compliant, since security is a necessary prerequisite in today's retail environment, and 4) are durable, since the store environment will challenge practically any piece of hardware.

An advantageous feature of the wearable mobile scanner system and mobile tablet device of the invention is the simplicity of their design, which ensures that the final product is both richly functional and cost effective. The mobile tablet device (upper receiver) is removable from the wearable mobile scanner system, is readily docked in other types of base scanner housing platforms, and is additionally capable of being docked in a fixed POS cash-wrap station. By using standard industry components such as industry standard MSR heads and barcode scanner components in conjunction with a preferably customized mobile tablet device, the wearable mobile scanner system with mobile tablet device integration capability therein will provide all the standard features of a typical consumer tablet, coupled with retail industry hardened components integrated into an industry hardened frame—built for industrial use—with an "easy to use" scan gun model, wearable model, hand held model and fixed station model and with the subject system and method readable therein. The functional specification of the wearable mobile scanner system is a mini mobile tablet device that preferably measures about 2 inches to 10.5 inches diagonally, preferably 4 inches to 7 inches, and most preferably 5 inches to about 5.5 inches diagonally. Rotation from landscape mode to portrait mode of the mobile tablet device is achieved with compression tubes—as rotate compression springs roll in and out via a dial—rotates smoothly but stays in place in each rotational position. Further, the mobile tablet device has two rotational positions on the forearm. One position is flat on the back of the forearm and the other is on the inside edge of the forearm for ease of operation. The mobile tablet device slides on and off from the wearable mobile scanner system base device through communication of a button on one side of the mobile tablet device, sliding on and off via a groove slide. The USB input devices of the wearable mobile scanner system are powered by their own rechargeable lithium ion battery, as well as a battery backup from the mobile tablet device, that extends battery life for a period of time that is necessary to assure uninterrupted operation on the sales floor. A specialized universal serial bus wiring harness is used for charging the lithium ion battery. The wearable mobile scanner system is carried on the back of the forearm and hand of the user. The scanner trigger is present as a button on the base of the palm and operated by the middle fingers or on the inside of the forefinger of the user and operated by the thumb to initiate the scan operation. Portability of the mobile tablet device upper receiver for the system and method wearable mobile scanner system implementation provides four different types of deployment. The mobile tablet device upper receiver is consistent with integration for the wearable mobile scanner system, the mobile scanner gun system, the handheld mobile tablet device, and a docked fixed POS cash-wrap station. Portability makes the system's mobile tablet device upper receiver even more valuable.

Generally stated, the present invention comprises a system and method for use with a barcode scanner and MSR input devices associated with an integration capable mobile tablet device. This system, method, wearable mobile scanner system and integration capable mobile tablet device is used by an employee on a sales floor of a retail establishment for both daily inventory management purposes for such tasks as physical inventory, cycle counting, inventory receiving, store to store transfers, return to vendor, product re-ticketing and to operatively identify a product by its barcode, establish price, promotions, physical and electronic coupons, customer loyalty data and rewards available and process sale of merchandise to a customer regardless of the physical location of the inventory throughout the retail chain. The sold inventory can be transferred to any store for customer pickup or shipped to a customer location from the wearable mobile scanner system. Once the transaction is completed on the wearable mobile scanner system, the sold item is allocated and systemically visible within the ERP system chain-wide. With this system, the customer does not have to bring the merchandise to a central check out location. In conventional systems, the checkout procedure is typically carried out without the customer having adequate knowledge of the product, or comparing its features, price or the like with other competing products. Through use of the system and method implemented for use with the wearable mobile scanner system and integration capable mobile tablet device, an employee of a retailer can sell merchandise from any store—not only from within the particular store's inventory, but within any store or any warehouse chain-wide. The wearable mobile scanner system reads the barcode of a particular item that is available for purchase, and retrieves from the POS store systems server, using wireless communication, details concerning the product. Such details may include current pricing, together with physical and electronic coupons, promotions, customer loyalty data and rewards, so that the retail sales employee on the floor can communicate the pricing structure to a potential customer at the point-of-sale. If the customer decides to purchase the item, the name of the customer as well as the customer's e-mail address is recorded if they are not already in the customer loyalty database, and the payment card of the customer is swiped on the wearable mobile scanner system. The appropriate encrypted payment card information is wirelessly transmitted via an encrypted communication to the POS store systems server within the store and onto a certified bank card authorization processor, whereby the encrypted authorization is returned to POS store systems server. Unless credit is denied, the purchase is authorized and the customer is given the purchased product. The receipt for this purchase can be printed on the store network or sent by e-mail to the customer. The POS store systems server updates its local inventory database and transmits that adjustment to the corporate ERP system of the product that has been sold, and the inventory for each of the items sold are updated chain-wide to show the current inventory of any particular item.

The mobile tablet device of the wearable mobile scanner system device preferably comprises a custom-developed, industry hardened device utilizing a base mount universal receiver with rotational coupling to connect to the wearable base housing, which is integrated therein, and a specialized universal serial port wiring harness to connect to the USB input devices. Various operating systems, such as those associated with the trade name Android (Google), iOS (Apple) and Windows (Microsoft) are contemplated.

The mobile tablet device is connected to a USB scanner input device, which is placed directly below the mobile tablet device in the mobile scanner gun model, integrated into the upper receiver in the hand held model, integrated into the back of the forehand in the wearable mobile scanner system, and fixed within the stand frame of the fixed POS cash-wrap station. The rotational coupling permits changing the orientation of the mobile tablet device in the portrait mode or in the landscape mode of the mobile tablet device display screen. There are a minimum of two standard USB input devices with others contemplated: A barcode scanner and an MSR. The MSR is positioned on the short edge of the mobile tablet device directly above the scanner in the scan gun model, which is forward facing on the base of the gun in front of the trigger. The USB scanner input device is connected to the mobile tablet device using a specialized universal serial bus wiring harness. The mobile tablet device has custom programmed applications in the IOS (Apple), Android (Google) and Windows (Microsoft) platforms. Other USB input devices contemplated are a variety of mobile chip and pin payment card readers that would replace the MSR on the mobile scanner gun system upper receiver or connected remotely using Blue Tooth technology for communication between the mobile tablet device and the mobile chip and pin payment card reader.

The wearable mobile scanner system is shown generally at 1300 in FIG. 1, and is appointed to be carried on the back of the forearm and wrist of a user. Referring to FIG. 1, the wearable mobile scanner system 1300 has a mobile tablet device 1301 connected to an interface device 1302, which may have a rotatable element that permits the alignment of the mobile tablet device in the portrait mode or landscape mode. Further, the mobile tablet device has two rotational positions on the forearm. One position is flat on the back of the forearm and the other is on the inside edge of the forearm for ease of operation. The figure shows the mobile tablet device in the landscape mode. A plurality of mobile applications are present in the mobile tablet device display screen (not shown) and accessible via application icons. The wearable mobile scanner system is secured to the back of the forearm and wrist of the employee working in a retail environment by a pair of straps 1303. The mobile tablet device is shown at 1301 connected to an interface device 1302. The display face of the mobile tablet device communicates key information. The barcode can be scanned by pressing a button 1304 preferably located on a finger appendage portion 1304 that is adapted to receive a user's point finger as illustrated in the figure, rather than using a trigger, and activates the scanner operation 1305. The MSR slot is present running along the short edge of the mobile tablet device. In landscape mode, the MSR is perpendicular to the scanner; in portrait mode, the MSR is parallel to the scanner, and is not visible in this figure. The MSR is a USB device and connected to the mobile tablet device through a specialized universal serial bus wiring harness 1301 and is also not visible in this figure since it is incorporated within the upper receiver housing. An EEPROM in the Main PCB carries out the functions necessary for the retail sales procedure, as described hereinafter in greater detail.

There are a number of specifically designed programmed mobile applications that allow the mobile tablet device to command the USB input devices through the specialized universal serial bus wiring harness to perform various functions typical to scanner and MSR operations. By selecting a mobile tablet device icon, the specially programmed mobile POS application is initiated, and a command is sent to the EEPROM to acquire a barcode scan. The mobile tablet device in this mode is ready to receive the barcode data from the USB input device and communicates with the POS store systems server at the retail facility to obtain specific product information such as, product availability within the store and chain, price and any promotions available, available physical and electronic coupons and customer loyalty information. The employee of the retail organization presents the data that is related to the particular item of interest to the customer. When the customer decides to purchase the particular item scanned, the employee of the retail organization uses the mobile POS application to process the sales transaction, if needed for shipping, enrollment or updating customer records, entry of the customer's pertinent information is taken if they are not already an updated loyalty rewards customer. At tender, this POS transaction can open the cash drawer wirelessly for cash transactions and can also launch a request for processing the sale using a customer payment card. The customer's payment card is swiped via the MSR, which is located on the short edge of the mobile tablet device. All pertinent payment card data is encrypted by the MSR and the EEPROM communicates the encrypted data through the specialized universal serial bus wiring harness to the mobile tablet device. The mobile POS application present in the mobile tablet device communicates all pertinent customer payment card data, using a PCI compliant encrypted wireless connection, to the POS store systems server. The POS store systems server contacts a certified bank card processor to obtain authorization for the customer purchase. If the purchase is authorized, this information is sent to the mobile tablet device display screen for customer signature using an integrated signature capture application built within the mobile POS application on the mobile tablet device and the customer is allowed to take possession of the merchandise purchased. The POS store systems server can send a receipt for the purchase to the e-mail address of the customer if desired. The POS store systems server records this purchase and adjusts the inventory data for the particular item sold through the corporate ERP system. A hard copy of the receipt can also be printed in a central printer present in the retail establishment. If the payment card purchase is denied, the mobile tablet device displays this credit request decline. The employee of the retail organization informs the customer of this credit purchase rejection and requests another form of payment. Thus the purchase of a product by a customer is accomplished by the mobile POS application by an employee having a wearable mobile scanner system anywhere in the retail establishment or beyond the store, without the customer having to bring the product to a sales counter and wait in line at the counter to consummate the purchase; and the inventory of any item in the retail establishment is always current and available for purchase transactions carried out by a plurality of sales personnel working with a plurality of customers at a wide variety of locations within the retail establishment.

Figure 2:
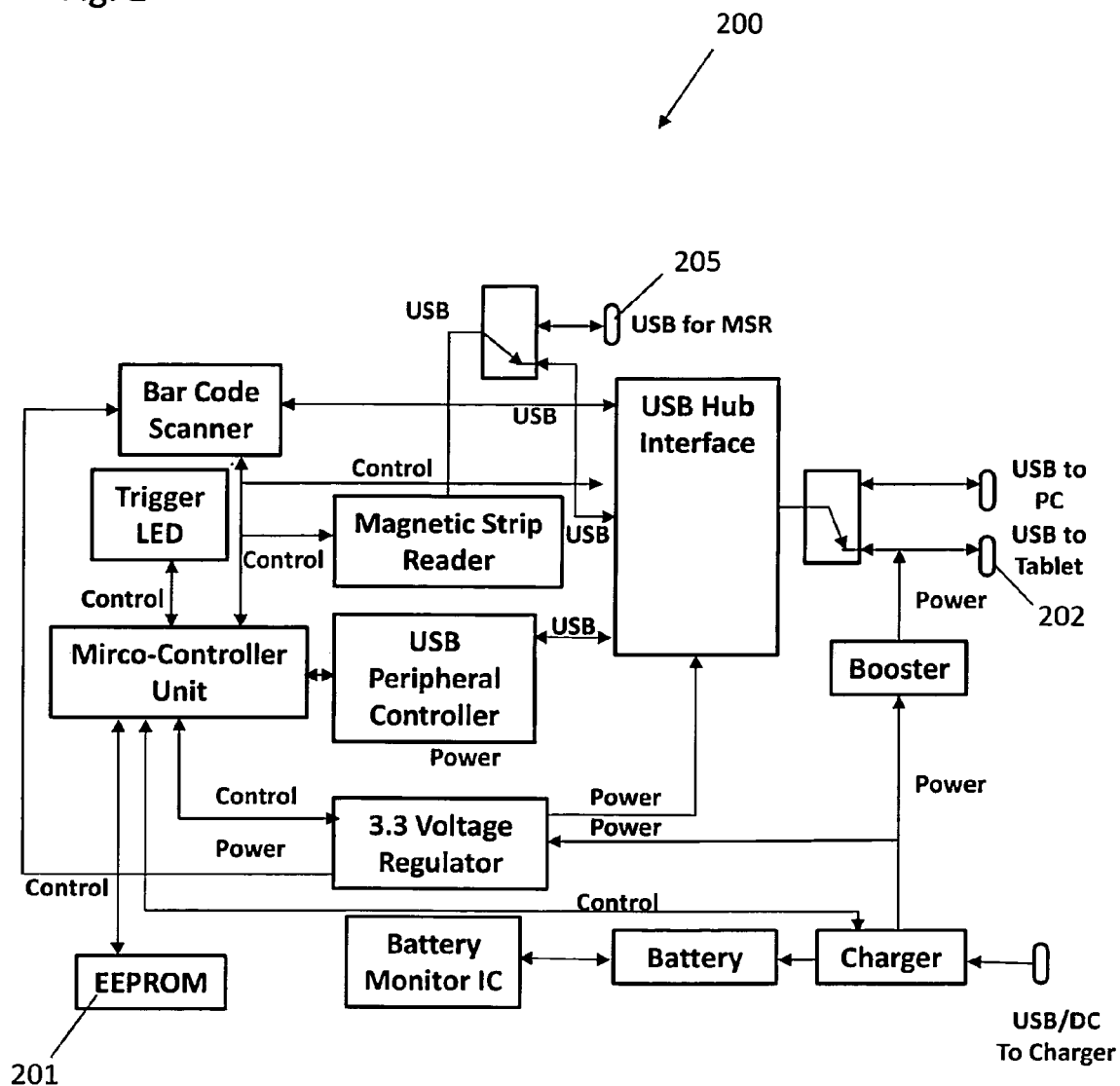
FIG. 2 is a schematic diagram illustrating the circuit of the Main PCB.

A key feature of the invention is an EEPROM that has a previously programmed instruction set present within the Main PCB. The schematic diagram of the Main PCB is shown in FIG. 2 at 200. The EEPROM is shown at 201 and is connected to the mobile tablet device at 202 and can process the command issued by the mobile applications to command either the barcode scanner or the MSR to acquire required data. The mobile tablet device has several mobile applications accessed by icons on the mobile tablet device screen and has functionality to communicate wirelessly via Wi-Fi or wireless cellular with the primary POS store systems server, a centrally located backup POS store systems server or directly to the corporate ERP system depending on the particular mobile application and this communication is secured using standard WPA or WPA2 wireless encryption methods; alternatively, a secondary means of communication is available through a wireless cellular module intergraded into the mobile tablet device and accessed via a data plan through a standard cellular carrier. When the payment card transaction is approved by the payment card issuing authority, the appropriate encrypted payment card information is wirelessly transmitted via an encrypted communication to the POS store systems server within the store and onto a certified bank card authorization processor, whereby the encrypted authorization is returned to POS store systems server. Unless credit is denied, the purchase is authorized and is sent to the mobile tablet device display screen for customer signature using an integrated signature capture application built within the mobile POS application on the mobile tablet device and the customer is given the purchased merchandise. The receipt for this purchase can be printed on the store network and/or sent by e-mail to the customer. The POS store systems server sends a request to the ERP system to update appropriate allocated inventory for merchandise sold and not available in its store. The ERP system processes that request and updates the corporate inventory databases, which are accessible chain-wide.

Due to the use of the EEPROM, which can process barcode and payment card information, the attached mobile tablet device can perform secure distributed sales within a retail establishment. Through StoreMS Mobile™ or StoreMobileRF™, trademarks of Retail Technologies Corporation, all store employees know instantaneously, the available inventory of any particular item across the chain; any product and its particular details can be reviewed with the customer and sold regardless of the products availability in the store ringing the sale. Thus a customer may look at a variety of products and ask the salesperson its price, detailed product description, as well as any physical and electronic coupons, promotions or customer loyalty data and rewards that are available. This provides a friendly, efficient and informative interaction between the customer and the retail salesperson; it establishes a one-on-one face-to-face relationship, which is appreciated by the customer and is conducive to an improved sales environment.

Figure 3:
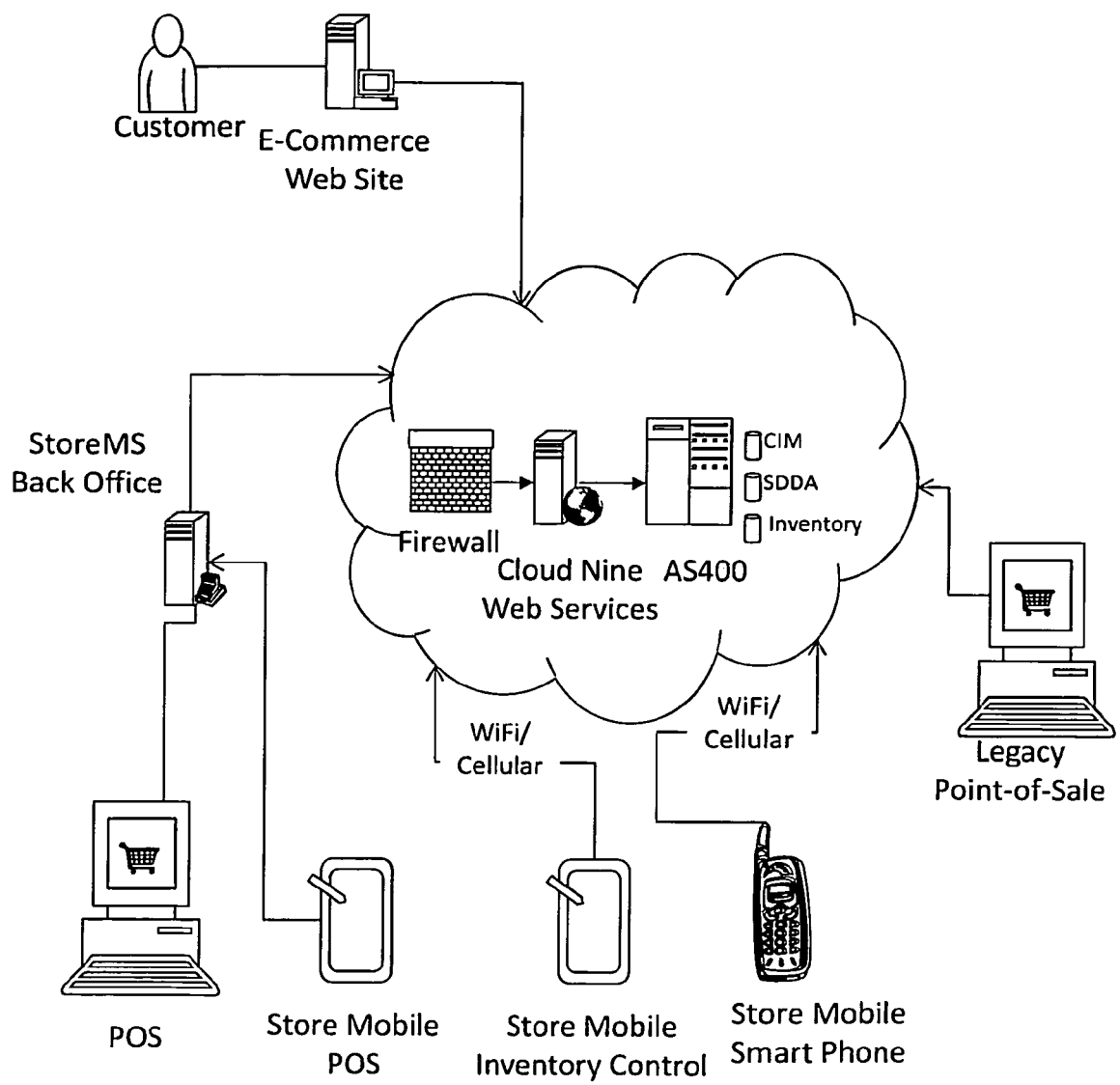
FIG. 3 is a schematic diagram illustrating an embodiment of the StoreMobile Cloud™ environment of the subject system and method.

FIG. 3 is a schematic diagram illustrating an embodiment of the StoreMobile Cloud™, a trademark of Retail Technologies Corporation, environment of the subject system and method. FIG. 4 is an in-depth schematic diagram illustrating an embodiment of the StoreMobile Cloud™ environment of the subject system and method. FIG. 5 is a flow chart diagram illustrating an embodiment of the back room management picture flow of the subject system and method. Referring generally to FIGS. 3-5, generally a three-phased approach is implemented by the subject system and method.

In phase I of building the StoreMobile Cloud™ environment, the central ERP inventory management applications relating to the store are mobilized through the subject system's StoreMobileRF™ application. As a result of the system's StoreMobileRF™ application, retailers can manage store inventory in real-time fashion, connected directly to their corporate ERP system from a wearable mobile scanner system in any store.

In phase II of building the StoreMobile Cloud™ environment, POS and related store systems are fully operational so that POS customer check-out is mobilized through its StoreMS Mobile™ application. The system's StoreMS Mobile™ application works alongside the system's StoreMobileRF™. Access to the internet, StoreMS Loyalty™, StoreMS Gift Card™ trademarks of Retail Technologies Corporation, and end to end encrypted bank card processing are standard features of the wearable mobile scanner system's StoreMS Mobile™ application. Advantageously, StoreMS Mobile™ excels at "line busting", reducing overall store register count, or completely replacing all fixed POS cash wrap stations.

In Phase III of building the StoreMobile Cloud™ environment, StoreMobileRF™ and StoreMS Mobile™ applications are both up and running together, with StoreMS Mobile™ directly accessing the POS store systems server and StoreMobileRF™ directly accesses the corporate ERP system. Additionally, StoreMS Mobile™ can now access the corporate ERP system for pertinent inventory availability throughout the chain and sell, transfer, and special order merchandise not available in its own store through the corporate ERP system. Further, the allocation of inventory for these special POS transactions is visible chain-wide through the StoreMobileRF™ application.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A method comprising:
    providing a wearable mobile scanner system, the wearable mobile scanner system comprising:
        a mobile tablet device having mobile application software and secure Wi-Fi and wireless cellular communicative capability with a store's POS store systems server, as well as a corporate ERP system;
        said mobile tablet device being attached to several USB input devices, including a scanner and an MSR (magnetic swipe reader) through a specialized universal serial bus wiring harness; and
        a Main PCB (printed circuit board) having a previously programmed E EPROM controlling all actions of said scanner USB input device and a button in a palm or along an index finger of said wearable mobile scanner system for activating a scan operation of an item of interest to a customer by an employee of a retail establishment, said EEPROM controlling all actions of said MSR USB input device by swiping a customer payment card through the MSR slot for processing customer payment through a PCI certified bank card processing network;
    wherein said mobile tablet device is removably connected to a wearable base housing through a base mount universal receiver with rotational coupling,
    activating said scan operation causing said EEPROM to communicate with said mobile tablet device, launching said application software to ready said mobile tablet device for receiving a scanned barcode;
    activating said MSR operation causing said EEPROM to communicate with said mobile tablet device, launching said application software to ready said mobile tablet device for receiving customer payment card data;
    said application communicating with said corporate ERP system to obtain detailed information for daily inventory management purposes for such tasks as physical inventory, cycle counting, inventory receiving, store to store transfers, return to vendor and product re-ticketing;
    said application software communicating with said POS store systems server to obtain detailed information of a product scanned, its inventory, selling price, electronic and physical coupons, promotions and customer loyalty data and rewards available, and displaying product data on a display screen of said mobile tablet device;

said employee of the store communicating item description, price and promotion data to the customer by scanning the product's barcode;

said customer deciding to purchase the product and the employee accessing a purchase routine of said application software, entering customer name, address and e-mail address if not already in customer loyalty database and swiping a customer payment card through USB MSR input device communicating formatted customer data securely to said POS store systems server and PCI (payment card industry) certified bank card processing network;

said POS store systems server contacting said PCI certified bank card processing network, that in turn, authorizes said purchase and communicates to the mobile tablet device that the customer has purchased the scanned product;

said corporate ERP system adjusting an allocation of said product sold, visible across a store chain that the store belongs to, said mobile tablet device communicating to the POS store systems server to send a receipt to the e-mail address of the customer or printing a hard copy of the transaction on a central printer of the store;

said mobile tablet device being operative, in the event that said authorization is denied, to inform the employee of this credit denial on the mobile tablet device display and alternate payment requested, so that said customer is informed;

whereby the customer purchases a product from any retail store employee having a wearable mobile scanner system receiving full product details, price, electronic and physical coupons, promotions, customer loyalty data and rewards and charges the purchase without having the need to bring the product to a central check out station and waiting in queue to check out.

2. The method of claim 1, wherein the wearable mobile scanner system is wearable on the forearm and hand of an employee in a retail store.

3. The method of claim 1, wherein rotation sets the mobile tablet device in portrait or landscape viewing format.

4. The method of claim 1, wherein said wireless communication is in the form of Wi-Fi on the retailer's corporate wide area network through a plurality of links located within the retail establishment or wireless cellular through a standard cellular carrier.

5. The method of claim 1, said application software communicating with the corporate ERP system through a second application through which real-time store level inventory management is inputted and stored for managing inventory from a wearable mobile scanner system in any location.

6. The method of claim 1, wherein said mobile tablet device includes a second application for processing customer sales transactions and performing in store inventory management functions directly from the corporate ERP system.

7. The method of claim 6, wherein said second application communicates with said POS store systems server to provide access to customer loyalty data and rewards, promotions, physical and electronic coupons, gift cards, and end to end encrypted payment card processing.

* * * * *